United States Patent [19]

Joseloff

[11] 4,177,880

[45] Dec. 11, 1979

[54] COMBINATION SUPERMARKET COUNTER AND CART THEREFOR

[76] Inventor: Stanley Joseloff, 185 S. Atlantic Ave., Cocoa Beach, Fla. 32931

[21] Appl. No.: 939,635

[22] Filed: Aug. 7, 1978

Related U.S. Application Data

[62] Division of Ser. No. 836,031, Sep. 23, 1977, Pat. No. 4,114,727.

[51] Int. Cl.² .............................................. A47F 9/02
[52] U.S. Cl. ..................................... 186/1 R; 312/282
[58] Field of Search ............ 186/1 L, 1 M, 1 N, 1 P, 186/1 Q, 1 S, 1 AA, 1 AE, 1 AB, 1 T, 1 V, 1 W, 1 F; 53/391; 280/33.99 F; 312/282, 301

[56] References Cited

U.S. PATENT DOCUMENTS

| | | | |
|---|---|---|---|
| 2,689,132 | 9/1954 | Kahn | 186/1 P |
| 3,443,665 | 5/1969 | Zschaeck | 280/33.99 F X |
| 3,454,139 | 7/1969 | Lachance et al. | 186/1 S |
| 3,789,957 | 2/1974 | Close | 280/33.99 F X |

Primary Examiner—Albert J. Makay
Assistant Examiner—Edmond G. Rishell, Jr.
Attorney, Agent, or Firm—Charles E. Temko

[57] ABSTRACT

A supermarket counter construction in which an upper surface of the counter is provided with an elongated slot. A cooperating cart includes a slideably mounted vertical side wall which when lowered for unloading the contents of the cart enters the slot which confines subsequent movement of the cart to a straight line parallel to the principal axis of the counter, and constrains the cart adjacent the edge of the counter so as to facilitate re-loading of the contents after checking and bagging.

3 Claims, 21 Drawing Figures

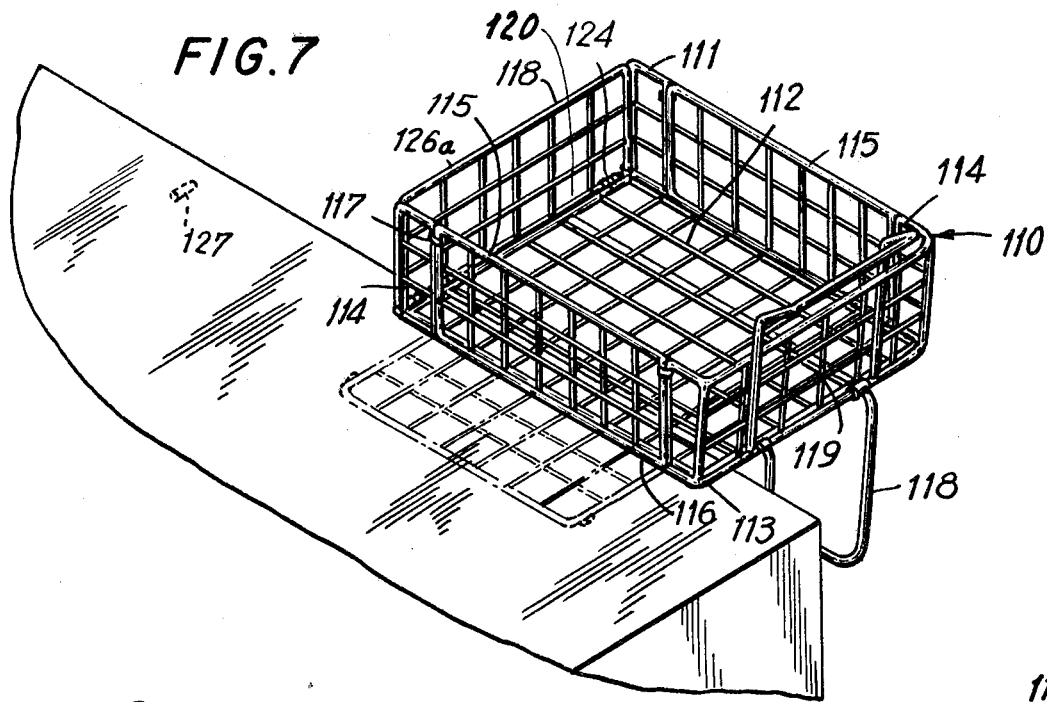
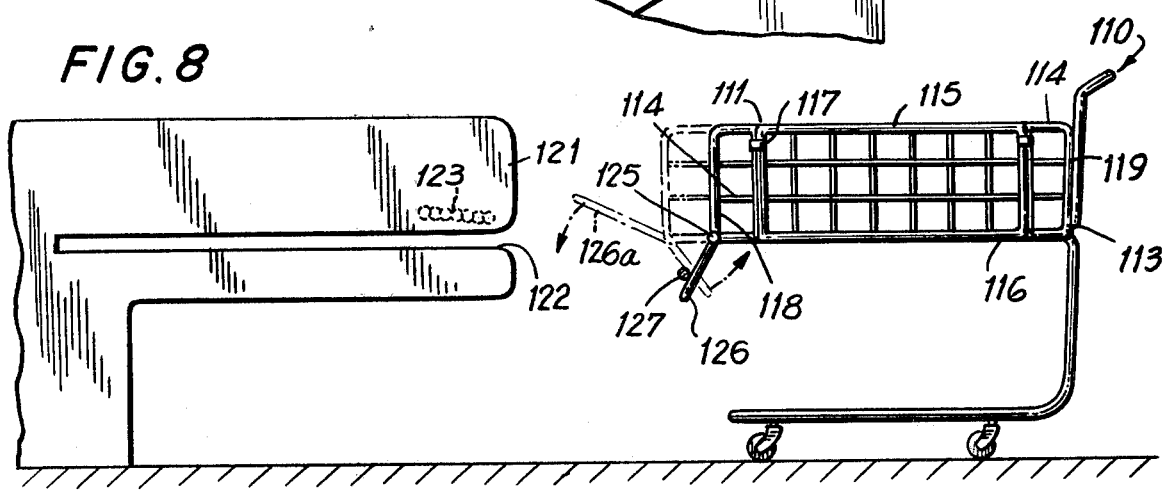
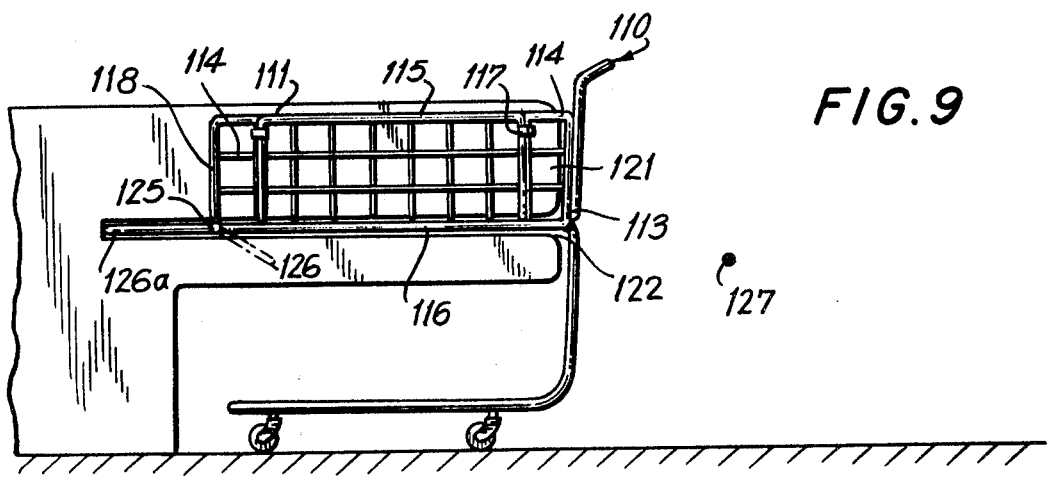

COMBINATION SUPERMARKET COUNTER AND CART THEREFOR

This is a division of application Ser. No. 836,031, filed Sept. 23, 1977, now U.S. Pat. No. 4,114,727.

BACKGROUND OF THE INVENTION

This invention relates generally to the field of checkout counter construction of a type commonly used in supermarkets and other self-service merchandising operations in which individual customers select displayed items, placing them in a shopping cart and, when selection is complete, moving the cart to a checkout counter for tabulation, bagging and removal from the store.

At the present stage of development of this form of merchandising, the purchased items are unloaded by the customer from his cart and placed upon a moving belt or other advancement means under the control of a cashier, whereby they are advanced in increments to the area of a cash register for individual tallying, following which they are moved either manually or by a second belt to a downstream area for subsequent bagging, following which they are picked up and carried away by the customer. The bagging has been performed for the most part by store personnel, either manually, or using bagging devices which have met with only limited commercial acceptance for reasons of complexity, high cost, elaborate maintenance and the like.

When the bagging operation is performed manually, it is normally done by the cashier, alone, or with the assistance of a bagging clerk. Notwithstanding the number of store personnel ininvolved, using existing methods and structure, it is not normally possible to service more than one customer at a time, and these customers progress in single file past the cashier.

SUMMARY OF THE INVENTION

Briefly stated, the invention contemplates the provision of a pair of parallel checking counters defining a single bay therebetween for the accommodation of a single cashier or checker, with no need for other store personnel. The cashier selectively uses one of a pair of registers or tallying devices, and alternately services customers on each side of the bay. The loaded bag conveyors of such devices are positioned to form a loading dock against which the front end or side wall of a novel shopping cart is positioned so that as bags are advanced they may be loaded directly upon a horizontal bottom wall of the cart, without the necessity of lifting the bag into the cart. In one embodiment, the front wall of the shopping cart is pivoted above an upper horizontal edge thereof to provide a loading port wherein the loading dock includes structure serving to pivot the front wall of the cart to a quasihorizontal position, following which the front wall, upon the cart leaving the dock, is rotated automatically through substantially the remainder of 360 degrees to effect a closure to the loading port. Latch means engaging the front wall completes the closure, and maintains four sided wall security while the goods are being transported from the checking counter to a parking lot or other unloading area. The rear vertical wall of the cart may be also pivoted at an upper edge thereof, in accordance with known practice to permit a plurality of carts to be nested for return to the store. The manual loading of individual bags is essentially under the control of the customer, thereby permitting the reduction of the amount of store personnel activity to a minimum. In another embodiment of the invention, the cart is provided with a front wall which pivots at the lower edge thereof through 90 degrees to horizontal position during a docking operation, and returns to vertical position when the cart is disengaged from the dock. This embodiment also includes pivotally mounted side walls which overlie the counter element, to facilitate the off loading operation prior to tallying. In still another embodiment, the side wall moves in a substantially vertical plane and enters an elongated slot in the counter, thus facilitating off loading and providing a guide for the cart relative to the counter which it partially overlies.

BRIEF DESCRIPTION OF THE FIGURES

In the drawings, to which reference will be made in the specification, similar reference characters have been employed to designate corresponding parts throughout the several views.

FIG. 7 is a schematic perspective view of a second embodiment of the cart.

FIG. 8 is a schematic side elevational view showing the approach of the cart to a docking operation.

FIG. 9 is a schematic side elevational view showing the cart in fully docked position.

DETAILED DESCRIPTION OF THE DISCLOSED EMBODIMENTS

Figure 1:
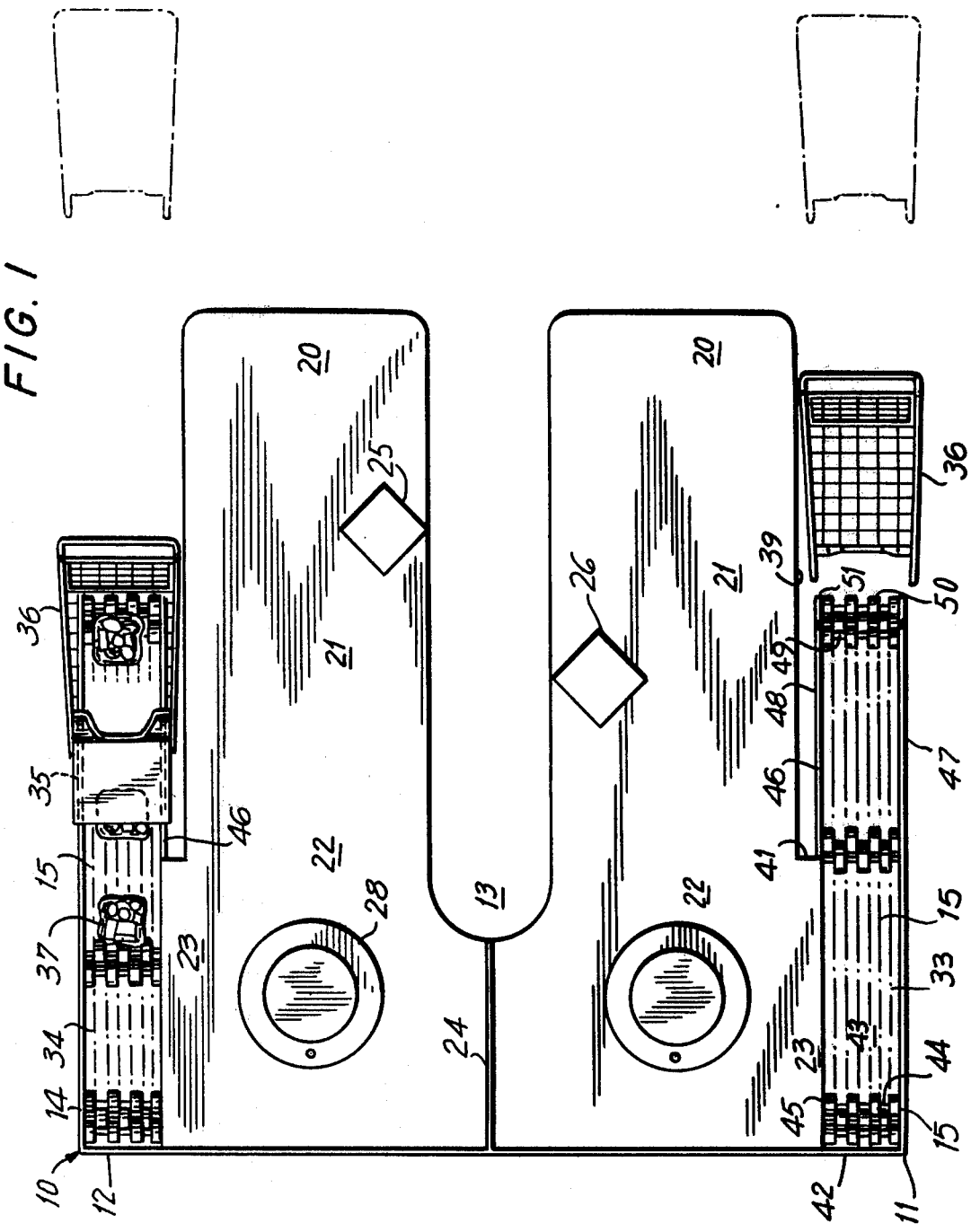
FIG. 1 is a schematic top plan view of a first embodiment of the invention.

In accordance with the invention, the embodiment, generally indicated by reference character 10 comprises broadly first and second symmetrical counter elements 11 and 12, respectively, defining a single bay 13; and first and second bag transporting elements 14 and 15, respectively.

The counter elements 11 and 12 are substantially similar and may be constructed in accordance with established practice. Each includes an upstream area 20 upon which the customer unloads selected articles from a shopping cart, from where they are advanced, either manually or mechanically to a checking area 21. Following checking, the items proceed to a downstream area 22 bordering a loading area 23 from where they are bagged. A vertical wall 24 separates the loading areas 23 of each counter to avoid confusion while permitting maximum utilization of the available space. Positioned within the bay 13 formed between the elements 11 and 12 are first and second registers 25 and 26, which are preferably positioned to allow for right hand operation in each case. An optional rotary table 28 enables the customer to position articles not immediately wanted for bagging out of the way as the bagging operation continues, or to bring items closer to hand for easier bagging.

The bag transporting elements 14 and 15 facilitate the loading of filled bags on a cart for transport from the market. A pair of conveyors 33 and 34 are disposed adjacent the downstream area 22 and form docks 35, each adapted to receive the front end of a shopping cart 36.

The conveyors 33 and 34 each include a base 38 positioned adjacent an outer vertical surface 39 of the counter elements 12 and 13, to which they are preferably secured. The base 38 preferably rests upon the same floor as the counter element for adequate mechanical support, and includes an outer wall 40, first and second end walls 41 and 42 as well as an upper surface 43. Extending between the outer wall 40 and the surface 39 are a plurality of transverse shafts 44 each of which supports a plurality of ball bearing rollers 45 of well known type in staggered relation to form a plurality of movable surfaces capable of supporting loaded bags 37 thereon for movement. Extending longitudinally from the end wall 41 is a cantilevered portion 46 of dock 35 including first and second side walls 47 and 48, respectively, which support similar transverse shafts 49 and rollers 50, the rollers 50 being inclined and so arranged as to form a continuation of the path provided by the rollers 45. The front edges 51 of the walls 47 and 48 are curved so as to form camming surfaces capable of coaction with the front wall 53 of the cart 36 as best seen in FIGS. 3A through 3E, inclusive in the drawings.

The cart 36 resembles in many respects the conventional type of cart used in supermarkets, and includes a frame element 54 and a basket element 55. The frame element 54 includes a pair of lower horizontal members 56 supporting wheeled casters 57. A vertical member 58 extends upwardly to support a horizontal handle 59.

The basket element 55 may be formed of conventional welded wire construction, and includes a lower wall or floor 60, a pair of side walls 61 and 62, a vertically inclined rear wall 63 adapted to rest upon the upper surface of the floor 60 which is preferably smooth. This conventional construction is retained in the present embodiment to permit the carts to be nested during retrieval by a store attendant so that a group of the same may be simultaneously transported back to the interior of the supermarket by a single clerk. Curved bumpers 64A assist in the opening of the rear of a succeeding cart (not shown) for this purpose. The front wall 67 is provided with a convex cam 67A and is also pivoted in a similar manner. It is formed of a solid injection molding of nylon, polypropylene, or other suitable synthetic resin capable of withstanding repeated impacts without deterioration. It is bounded by side edges 68 and 69, a free lower edge 70, and a curved upper edge 71. The edge 71 defines an upper opening or clear area 75 extending considerably below the corners 76 and 77 which are secured for pivotal movement by pintles 78.

Figure 6:
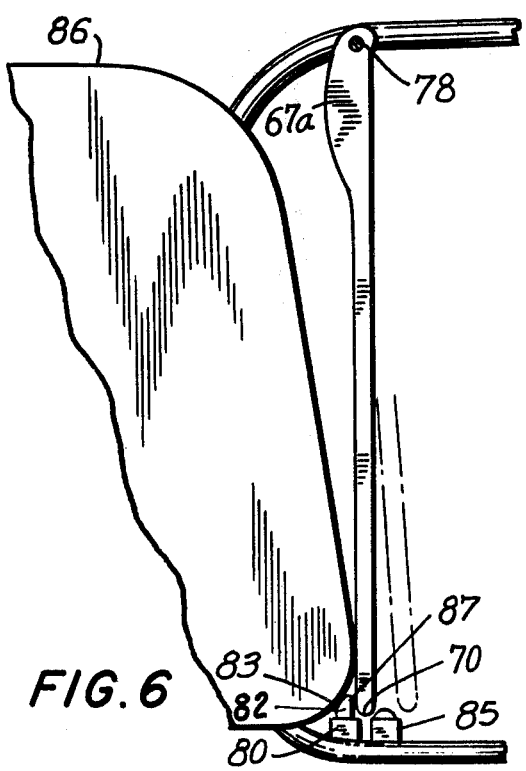
FIG. 6 is a fragmentary enlarged side elevational view corresponding to the lower central portion of FIG. 3.

A plurality of resilient latches 80 (FIG. 6) are positioned adjacent the front edge of the lower wall 60, and include members 82 having cammed surfaces 83 which are deflected by contact with the lower edge 70 of the front wall 67 during operation. Resilient detents 85 are positioned to contact a portion of the lower edge 70 while the remaining portion contacts the retaining surfaces 87 on the members 82.

Figure 2:
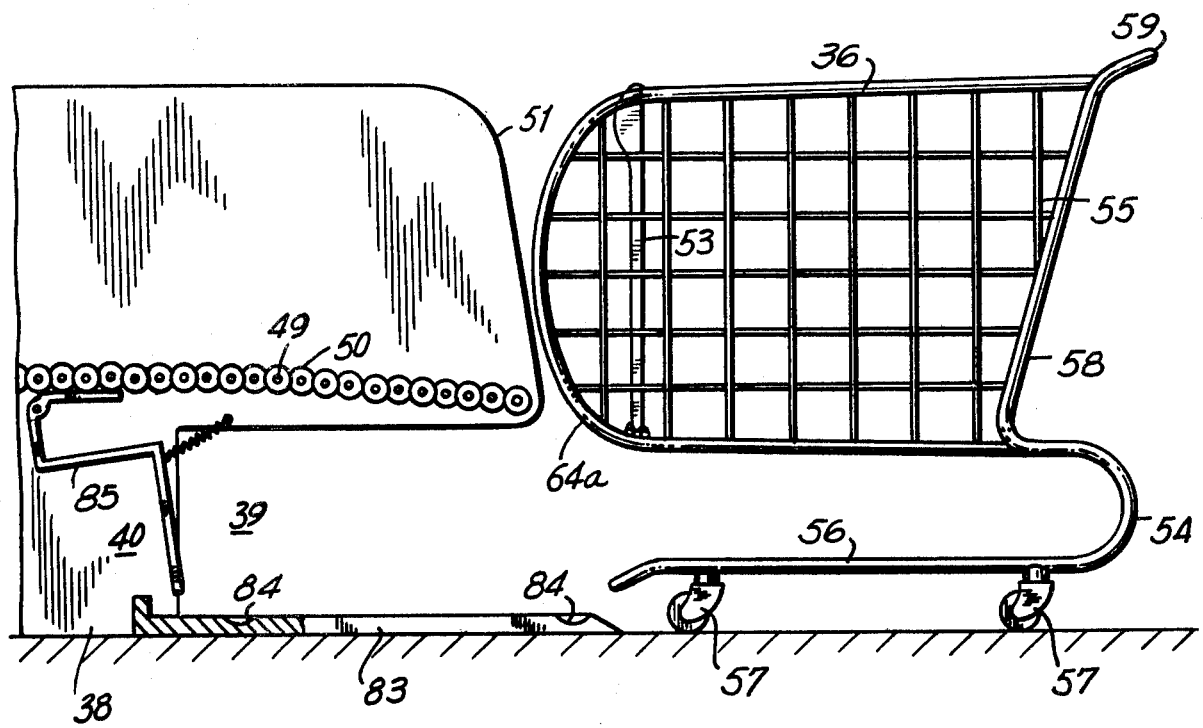
FIG. 2 is a fragmentary side elevational view thereof, showing the approach of an individual shopping cart to docking position.
Figure 4:
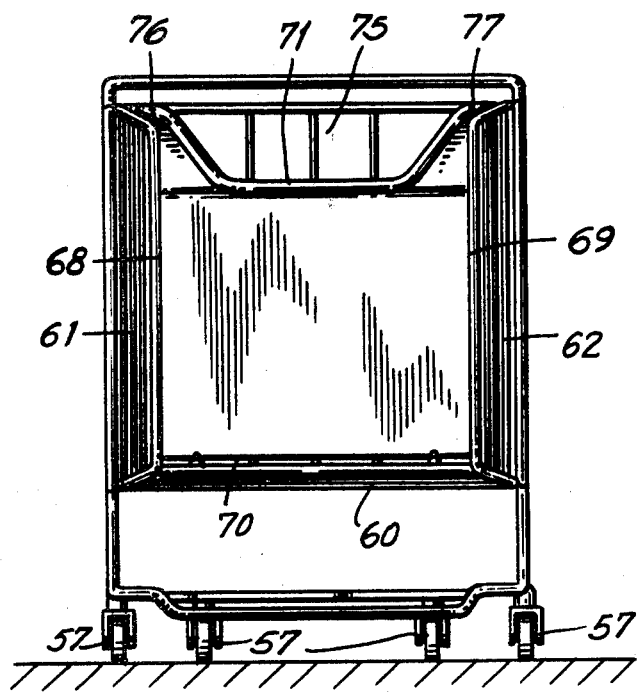
FIG. 4 is a front elevational view of the cart.
Figure 5:
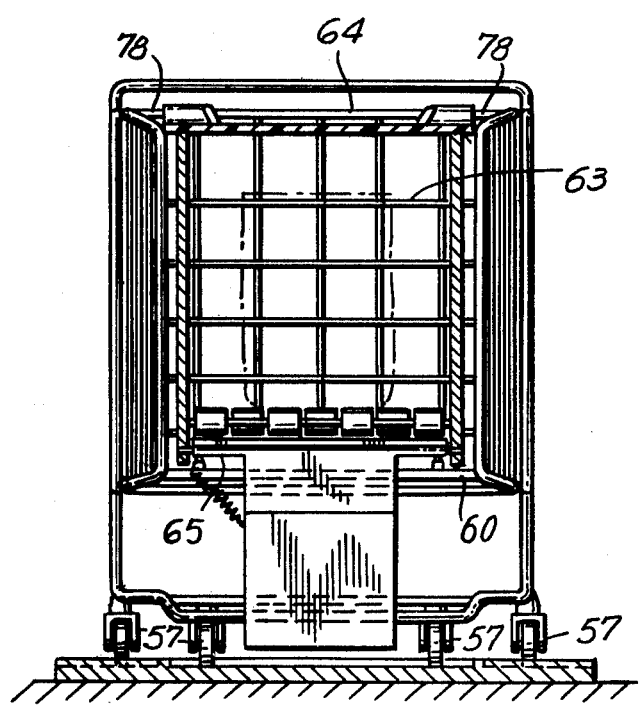
FIG. 5 is a sectional view as seen from the plane 5—5 in FIG. 3.

Referring again to FIG. 2, a raised floor 83' in the form of a synthetic resinous molding is provided directly beneath the dock 35, including recesses 84 for selective engagement with the wheels of the cart to maintain the cart in proper position during loading. When in such position, a portion of the cart strikes a projection on a resilient brake mechanism 85' which releases the rollers 45 immediately adjacent the dock rollers 50, as will more fully appear hereinafter.

OPERATION

As a customer with filled cart approaches the checkout area, he proceeds to unload the cart in normal manner on the upper surface of the counter element for checking. When the cart is unloaded, he then proceeds with the cart to the downstream area 22 where the front end of the cart is pushed into engagement with the dock 35. As the cam 67A strikes the front edges 51 of the dock, the front wall 67 is pivoted through substantially 270 degrees inwardly about the pintle 78 to a substantially horizontal position to be retained by contact of a projection on the lower edge thereof with an upper edge 86 of the dock. The customer then leaves the cart, and proceeds to the downstream area to where articles which have been tallied are moving from the cashier. The customer then proceeds to load tallied articles in accordance with his requirements, until all of the necessary bags are adequately filled. At this point, they are manually guided over the conveyor onto the dock and into the cart. Depending upon the length of the cart, three or four bags can be positioned on the dock, and where the total purchases can be bagged in this number of bags, the customer departs by returning to the rear of the cart, and pulling the cart rearwardly to disengage it from the dock. As the rollers on the dock are slightly inclined in a direction toward the rear wall of the cart, this movement will cause the bags to move under the action of gravity onto the upper surface of the floor of the cart without further manipulation. As the cart clears the dock, the braking mechanism 85 reenages and prevents accidental movement of any filled bags remaining on the conveyor. If there are such bags, if desired, they may be manually lifted and placed on top of the previously loaded bags already in the cart. When the cart clears the dock, the front wall 67 is no longer supported, and it falls under the action of gravity with an angular velocity sufficient to trip and pass the latches 80, following which the front wall is secured to the remainder of the basket element.

Once clear of the dock, the customer proceeds with the cart from the checking area. During the period in which the customer has been bagging tallied articles, and moving the loaded bags to the dock, the cashier may turn her attention to the line of customers on the opposite side of the bay 13, where the process is repeated. While she is tallying articles on the counter element 12, a third customer may commence unloading selected articles on the upstream end 21 of the counter element 11. Although occasional delays may occur, for the most part of her time, the cashier may be actively engaged in tallying articles and receiving payment therefor, without the necessity of participating in any part of the bagging or loading of bags on the carts.

Figure 3:
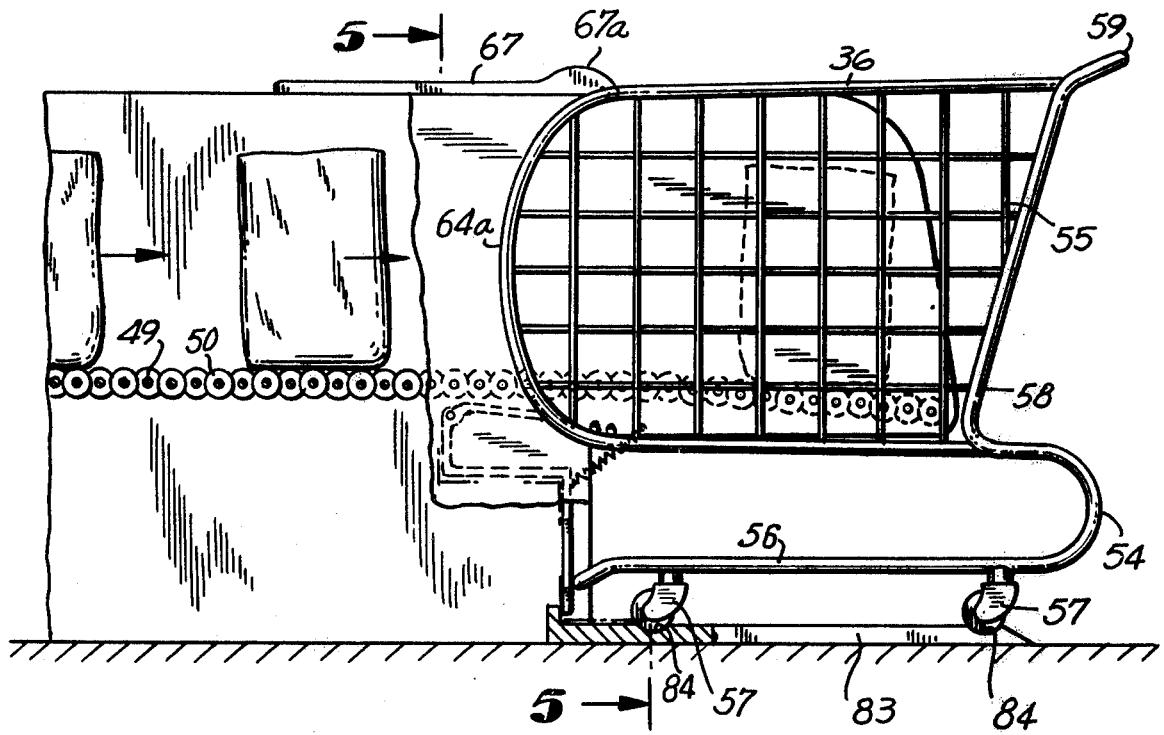
FIG. 3 is a fragmentary side elevational view of the shopping cart in fully docked position.
Figure 3A:
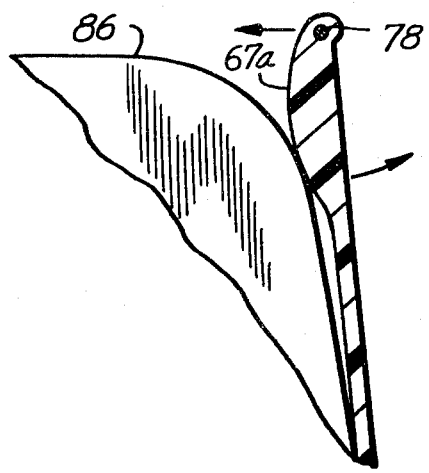
FIG. 3A through 3E are schematic views showing the progressive opening of a front wall of the cart during a docking operation.
Figure 3B:
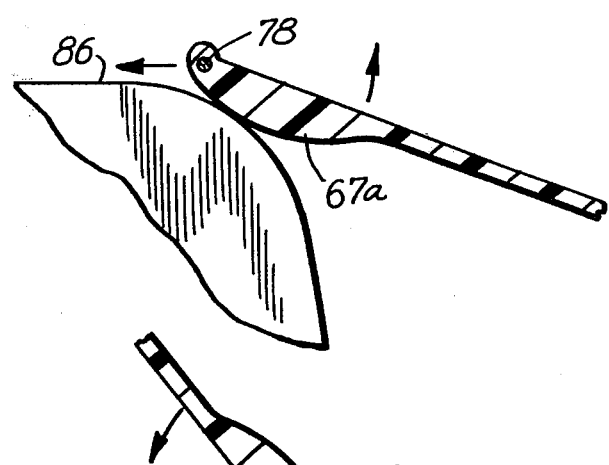
Figure 3C:
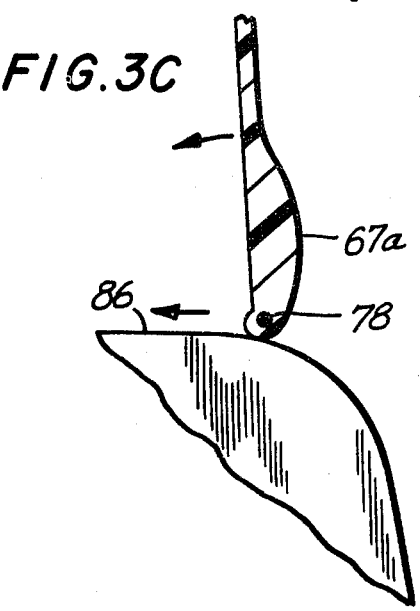
Figure 3D:
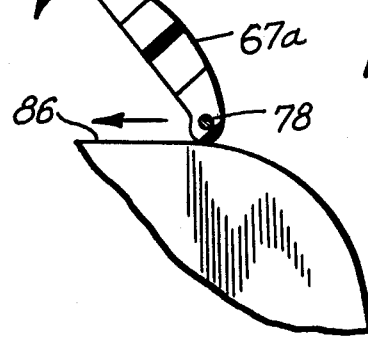
Figure 3E:
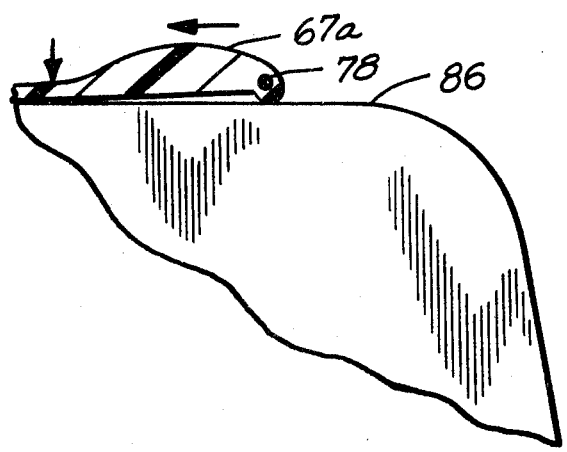

It will be observed that by positioning the upper edge of the forward wall at a substantially lower level than the axis of pivotal rotation, when the wall is moved to its upwardmost position as shown in FIG. 3C, it is possible to clear the entry of any bags which might contain unusually tall contents, such as glass bottles, large containers and the like.

It may be noted that the leading ends of the counter elements are preferably shaped to rounded configuration, whereby customers are encouraged to either form a single queue directly opposite the cashier, and move either to the left or right depending upon availability of space for tallying. Even when two queues are formed, the end of the queue may be positioned a foot or two from the ends to enable a customer who would normally be serviced at one counter to be serviced at the other.

SECOND EMBODIMENT

Turning now to the second embodiment of the invention (FIGS. 7 to 9), generally indicated by reference character 110, this embodiment differs from the first embodiment in that it includes a cart element particularly adapted for more convenient offloading than is possible in the case of the first embodiment.

To this end, the cart 111 is constructed so that the bottom wall 112 of the basket element 113 is substantially at counter height, and is provided with side walls 114, having central sections 115 that are hingedly mounted at the lower edges 116 thereof, so that when the cart arrives for offloading alongside a counter element, it is necessary only to open the latches 117 allowing the respective side wall to drop to the counter surface, and transfer the load to the counter surface. To facilitate this, the lower frame element 118 which supports the basket element 113 is considerably narrower than the width of the basket element, thereby permitting the basket element to partially overlie the counter surface. In such position, the side walls can be conveniently unlatched by the cashier, without leaning or stooping.

Because of the greater height of the floor of the basket element, the side walls 114, front wall 118 and rear wall 119 are of considerably lower height. The front wall 118 is pivoted at the lower edge 120 thereof, rather than at the upper edge, as in the first embodiment. The dock 121 is provided with a slot 122 which accommodates the front wall in lowered condition beneath the rollers 123. A coiled spring (not shown) surrounds the transversely extending pintle 125, upon which the front wall 118 is mounted and normally urges the wall to vertical position.

Also mounted on the pintle is a cam follower 126, the operative face of which contacts a fixed cam 127, supported upon a side wall of the counter element. As the cart approaches docking position after unloading, the cam 127 serves to rotate the front wall 118 to horizontal position against the action of the spring 124 for a period of time sufficient to enable the upper edge 126a to enter the slot 122, wherein the front wall is maintained out of the way during loading.

When the loaded cart is withdrawn, the upper edge 126a will escape from the slot 122, following which the spring 124 returns the front wall to a vertical position. Lost motion means (not shown) permits the cam follower to ride over the cam without affecting this return movement. If desired, one or more resilient detents (not shown) similar to the detent 85 in the first embodiment, may be employed to prevent chatter of the front wall during transport of the loaded cart.

THIRD EMBODIMENT

Turning now to the third embodiment of the invention (FIGS. 10, 11 and 12), generally indicated by reference character 210, this embodiment differs from the second embodiment in the substitution of a vertically upwardly flared basket element 213, which is pivotally mounted to permit stacking not only of the carts, but, with the basket elements in vertically nested condition. This feature permits carts of this type, which are normally referred to in the art as "over the counter" carts, to have basket elements which are considerably deeper than heretofore have been possible, without sacrificing the degree to which telescoping is possible, whereby the total storage space for unused carts remains substantially the same as with prior art constructions, while the total capacity of the basket elements is substantially increased.

With the increased depth of the basket element 213, it is preferable to open the sides of the cart by a downward sliding movement rather than a pivoting movement, thereby allowing greater utilization of the available area at the upstream part of the counter element 220. To this end, each side wall 215 is provided with a pair of vertically arranged guides 216 in which the movable portion 217 of the sides are slidably disposed. Latches 218 hold the portions 217 in depressed position against the action of springs 219 during both loading and unloading operations.

To permit the basket element 213 to overlie the counter 220, an elongated slot 221 is provided into which a portion 217 selectively projects in latched condition. This engagement serves as a guiding means for subsequent movement of the cart from upstream to downstream areas, and the portion 217 remains in depressed condition until the loaded bags are conveyed onto the basket element. At this point, the sliding portion is unlatched, permitting the springs to return the sliding portion to closed position, and release the cart from engagement with the counter.

Figure 13:
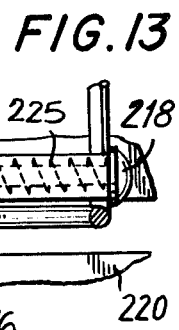
FIG. 13 is a sightly enlarged fragmentary vertical sectional view as seen from the plane 13—13 in FIG. 11.
Figure 14:
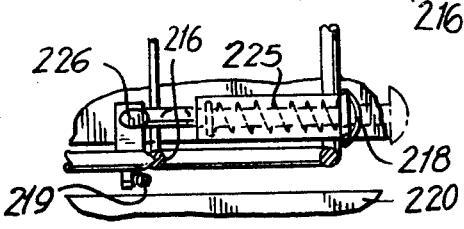
FIG. 14 is a fragmentary sectional view similar to that seen in FIG. 13, and showing certain of the component parts in altered relative position.

Since the upper edge 218a of the portion 217 is depressed to the level of the upper surface 223 of the counter element 220, the latch means is most conveniently positioned just above the bottom wall 224 of the basket element 213. The means 218 may be a simple retractable type, as shown in FIGS. 13 and 14, which may be readily withdrawn by the cashier or the customer, against the action of a spring 225, and having an operative end 226 which projects into the path of movement of the portion 217 in the adjacent guide 216.

Figure 10:
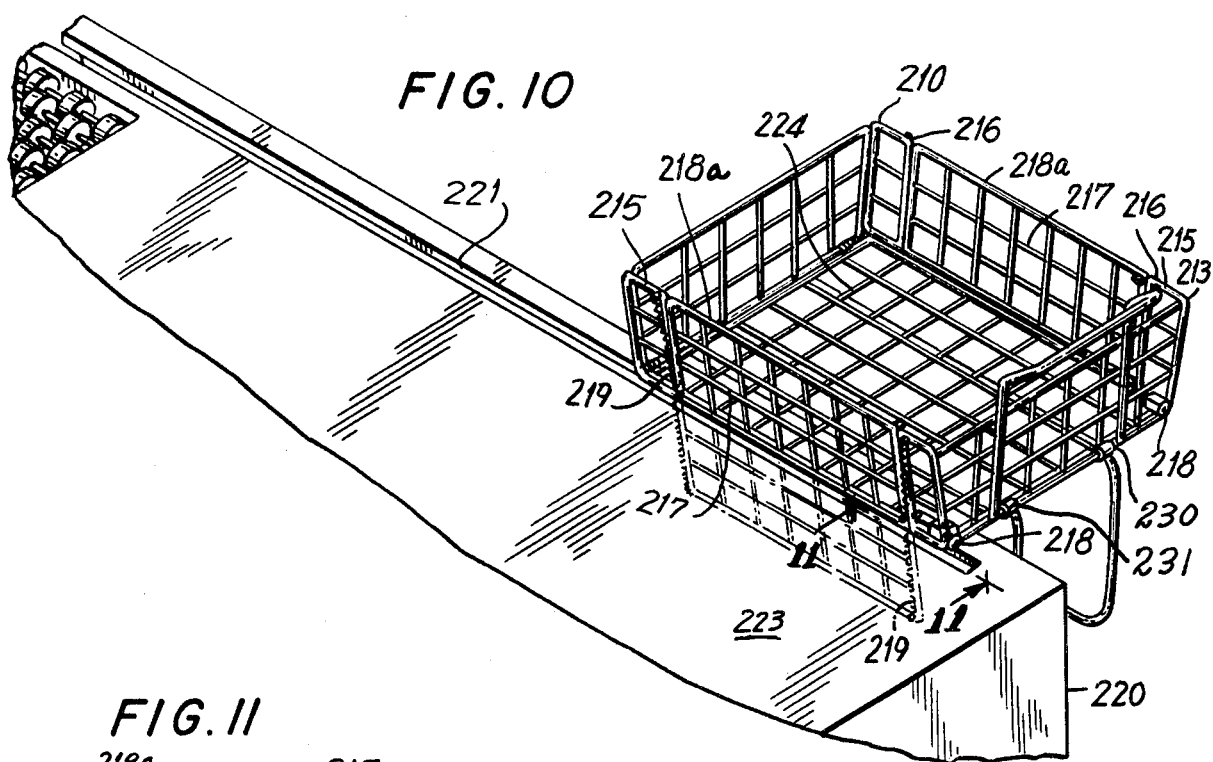
FIG. 10 is a fragmentary perspective view of a third embodiment of the invention.
Figure 11:
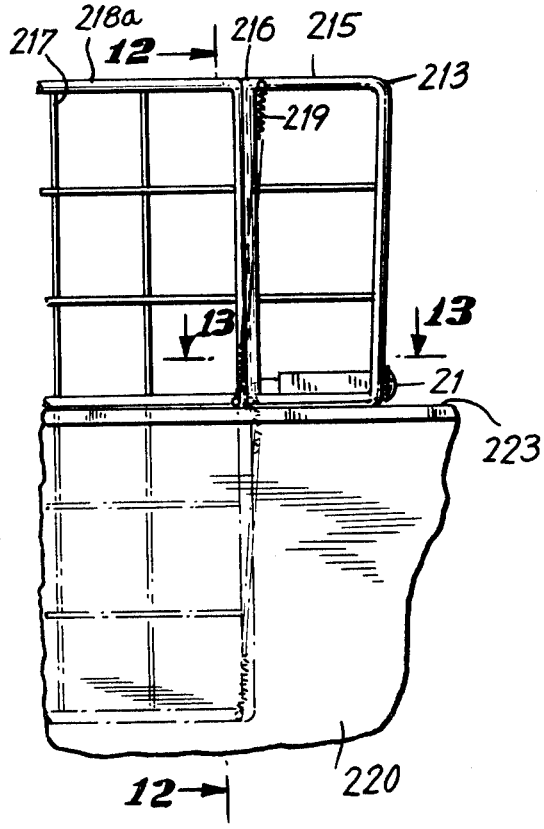
FIG. 11 is a fragmentary vertical sectional view as seen from the plane 11—11 in FIG. 10.
Figure 12:
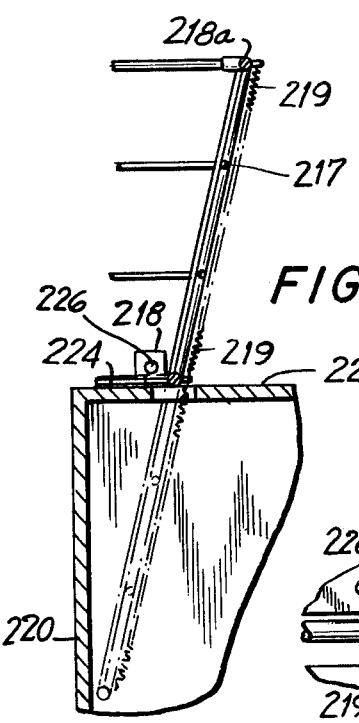
FIG. 12 is a fragmentary vertical sectional view as seen from the plane 12—12 in FIG. 11.

As will be observed in FIGS. 10 and 12, the basket of the cart may be pivotally mounted at points 230 and 231 for rotation about a horizontal axis to a vertical position (not shown). Because the side walls are flared, it is possible to nest the basket elements when a plurality of carts are stacked for storage.

THE FOURTH EMBODIMENT

Turning now to the fourth embodiment of the invention (FIGS. 15 and 16), generally indicated by reference character 410, this embodiment differs from the first embodiment in the provision of the sliding side wall portions of the third embodiment.

Using the relatively deep basket element 411, or, for that matter, when using any conventional shopping cart of this general type, it is often inconvenient for those persons of relatively short stature, or those having short arms, to comfortably offload the cart at the upstream counter area. As larger items are removed, relatively smaller items which were supported thereby fall to the floor of the cart, making necessary the extension of the retrieving arm of the user to substantially the level of the floor of the basket element over the upper edge of one of the side walls. By providing side wall portions which can be slidably lowered when the cart is adjacent the upstream area of the counter the cashier as well as the customer can conveniently reach such small items for easy retrieval. It is not necessary that the movable side portions be lowerable to a point where the upper edge thereof is in coplanar relation with the bottom wall of the basket element. Rather, it is sufficient that the upper edge clear the upper surface of the counter element. As the movable side wall portion in lowered condition is not disposed in a slot in the counter, the upper edge thereof is readily available, and the resilient means to raise it, as provided in the third embodiment, is unnecessary.

Figure 15:
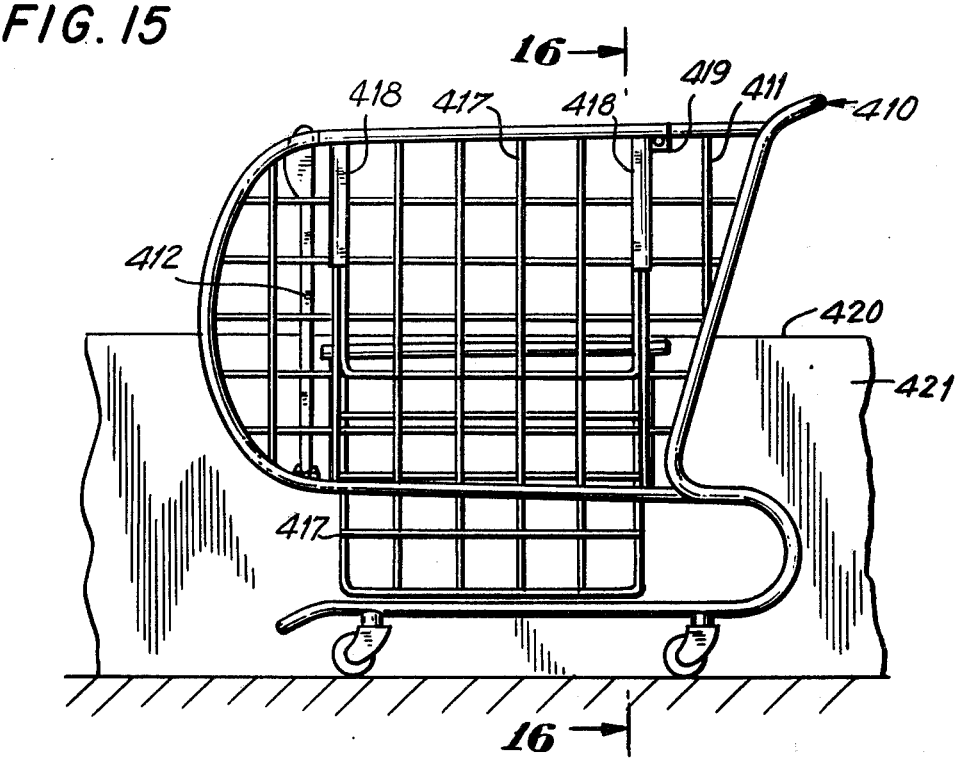
FIG. 15 is a fragmentary side elevational view showing a fourth embodiment of the invention.
Figure 16:
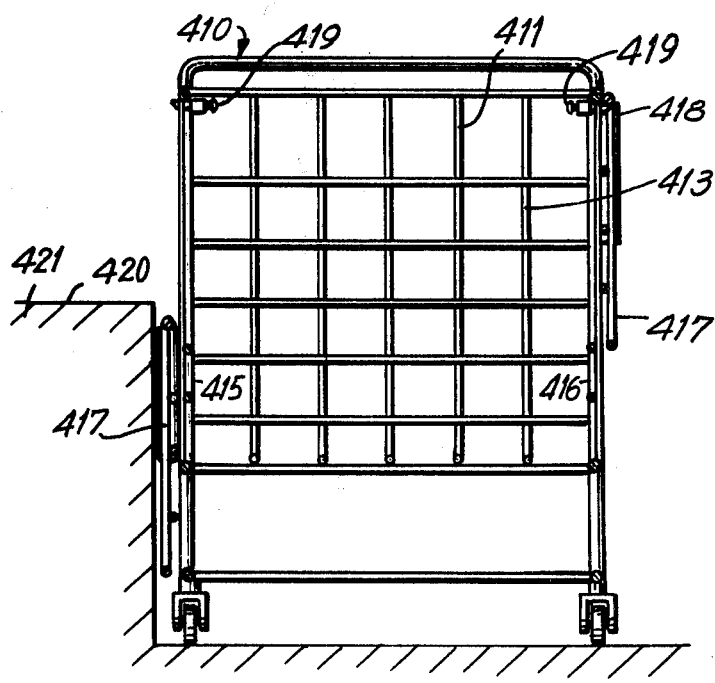
FIG. 16 is a vertical transverse sectional view as seen from the plane 16—16 in FIG. 15.

Referring to FIGS. 15 and 16, the cart 410 includes a basket element 411 having a front wall 412, a rear wall 413, and side walls 415 and 416. Each of the side walls includes a slidable portion 417 suspended in guides 418 and supported in raised position by a manually operated latch 419, so located as to be operable by either the cashier or the customer.

FIG. 16 illustrates a cart in position for offloading with a portion 417 lowered to the level of the upper surface 420 of a counter element 421. When using the cart with a conventional counter, the slidable portion 417 may be lowered at the time of offloading at the upstream end of the counter and allowed to remain in that condition as the cart is moved downstream for reloading of bagged items. When the customer is about to move the cart from the counter, it is then raised to be relatched.

In this connection, it may be noted that in the third embodiment a safety factor is present in that it is impossible to move the cart from the onloading area of the counter element until the sliding wall portion has been raised, for the reason that until the sliding portion clears the slot in the counter element, the cart cannot leave the dock area. This safety factor is not present in the fourth embodiment, but since at the time of onloading, the small items have been already bagged, and the bags sit in the cart with the lower portions thereof enclosed by that part of the side wall which remains stationary, the likelihood of loss of bagged items is relatively small.

I wish it to be understood that I do not consider the invention limited to the precise details of structure shown and set forth in this specification, for obvious modifications will occur to those skilled in the art to which the invention pertains.

I claim:

1. In combination, an improved check-out counter and shopping cart cooperating therewith; said counter construction including an upper surface having an elongated slot therein, extending between upstream and downstream areas adjacent a longitudinal edge thereof; said cart including a wheeled frame element and a basket element supported by said frame element and including front, rear, and a pair of side walls; at least one of said side walls having a portion thereof arranged for substantially vertical sliding movement between open and closed positions; said cart being selectively positioned with said basket element overlying said upper surface of said counter, wherein said slidably mounted portion of said side wall in open position penetrates said slot for horizontal sliding movement therein.

2. The combination in accordance with claim 1, further characterized in said slidably mounted side wall portion including resilient means urging said portion to closed position, and latch means selectively holding said slidably mounted portion in open position against the action of said resilient means.

3. The combination in accordance with claim 1, further characterized in said walls of said basket element being upwardly outwardly flared, and pivotally mounted relative to said frame element to permit vertical nesting of the basket elements of stacked carts during storage.

* * * * *